US006523180B1

(12) United States Patent
Christopher

(10) Patent No.: US 6,523,180 B1
(45) Date of Patent: Feb. 25, 2003

(54) DOG HANDLER SYSTEM

(76) Inventor: Christopher L. Christopher, 7196 Ransdorp, Memphis, TN (US) 38133

( * ) Notice: Subject to any disclaimer, the term of this patent is extended or adjusted under 35 U.S.C. 154(b) by 0 days.

(21) Appl. No.: 09/977,114

(22) Filed: Oct. 11, 2001

(51) Int. Cl.$^7$ .............................................. A41D 27/12
(52) U.S. Cl. ..................... 2/59; 2/16; 2/900; 119/714; 119/857
(58) Field of Search ............... 2/16, 59, 900, 2/22, 170, 919; 119/712, 714, 850, 857, 863; 128/878; 602/62–64

(56) References Cited

U.S. PATENT DOCUMENTS

| | | | |
|---|---|---|---|
| 1,624,429 A | | 4/1927 | Palmer |
| 4,277,848 A | | 7/1981 | Boehland |
| 4,476,857 A | * | 10/1984 | Levine .......................... 128/77 |
| 4,884,297 A | * | 12/1989 | Triche ............................. 2/16 |
| 4,951,317 A | * | 8/1990 | Gray et al. ...................... 2/16 |
| 5,101,515 A | | 4/1992 | Holt et al. |
| 5,159,718 A | | 11/1992 | Moyer |
| 5,581,815 A | | 12/1996 | Hans |
| 5,644,793 A | * | 7/1997 | Lahaussois et al. .............. 2/59 |
| 5,911,197 A | * | 6/1999 | Schmid |
| 5,953,757 A | | 9/1999 | Blanks |
| 6,176,407 B1 | * | 1/2001 | Jones et al. .................. 224/584 |
| 6,272,688 B1 | * | 8/2001 | Wilson .......................... 2/170 |

* cited by examiner

Primary Examiner—John J. Calvert
Assistant Examiner—Katherine Moran

(57) ABSTRACT

A dog handler system for assisting dog handlers wearing camouflage to effectively transmit hand signals to their dog. The dog handler system includes a sleeve member having a first sleeve surface and a second sleeve surface, a flap member having a first flap, surface and a second flap surface attached to a lower portion of the sleeve member, and a plurality of hook and loop fasteners attached to the sleeve member and the flap member for allowing selective securing of the flap member about the second sleeve surface. The first sleeve surface and the first flap surface are comprised of a camouflage color and design. The second sleeve surface and the second flap surface are comprised of a non-camouflage color and design that is easily viewed by a dog.

21 Claims, 5 Drawing Sheets

DOG HANDLER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to dog handler devices and more specifically it relates to a dog handler system for assisting dog handlers wearing camouflage to effectively transmit hand signals to their dog.

2. Description of the Prior Art

Individuals, such as hunters, that handle dogs often times provide hand and arm signals to their dog to inform the dog where to look for a fallen bird or the like. These hand and arm signals may take various forms and it is extremely important for the dog to be able to clearly see the hand and arm of the individual.

However, often times individuals hunting desire to wear camouflage clothing that covers arms and hands which makes it difficult for the dog to visualize the position of the arm and hand. Camouflage clothing may be comprised of long-sleeved shirts, coats, jackets, gloves, mittens and the like. A further problem is that the relatively small size of an individual's arm and hand may be difficult to see by the dog from a significant distance.

Examples of patented devices which are related to the present invention include U.S. Pat. No. 5,159,718 to Moyer; U.S. Pat. No. 5,101,515 to Holt et al.; U.S. Pat. No. 5,911,197 to Schmid; U.S. Pat. No. 5,581,815 to Hans; U.S. Pat. No. 5,953,757 to Blanks, I., U.S. Pat. No. 4,277,848 to Boehland; U.S. Pat. No. 1,624,429 to Palmer.

While these devices may be suitable for the particular purpose to which they address, they are not as suitable for assisting dog handlers wearing camouflage to effectively transmit hand signals, to their dog. Dog handlers that desire to wear camouflage clothing unfortunately are unable to effectively signal their dog.

In these respects, the dog handler system according to the present invention substantially departs from the conventional concepts and designs of the prior art, and in so doing provides an apparatus primarily developed for the purpose of assisting dog handlers wearing camouflage to effectively transmit hand signals to their dog.

SUMMARY OF THE INVENTION

In view of the foregoing disadvantages inherent in the known types of dog handling systems now present in the prior art, the present invention provides a new dog handler system construction wherein the same can be utilized for assisting dog handlers wearing camouflage to effectively transmit hand signals to their dog.

The general purpose of the present invention, which will be described subsequently in greater detail, is to provide a new dog handler system that has many of the advantages of the dog handling systems mentioned heretofore and many novel features that result in a new dog handler system which is not anticipated, rendered obvious, suggested, or even implied by any of the prior art dog handling systems, either alone or in any combination thereof.

To attain this, the present invention generally comprises a sleeve member having a first sleeve surface and a second sleeve surface, a flap member having a first flap surface and a second flap surface attached to a lower portion of the sleeve member, and a plurality of hook and loop fasteners attached to the sleeve member and the flap member for allowing selective securing of the flap member about the second sleeve surface. The first sleeve surface and the first flap surface are comprised of a camouflage color and design. The second sleeve surface and the second flap surface are comprised of a non-camouflage color and design that is easily viewed by a dog.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a dog handler system that will overcome the shortcomings of the prior art devices.

A second object is to provide a dog handler system for assisting dog handlers wearing camouflage to effectively transmit hand signals to their dog.

Another object is to provide a dog handler system that allows a dog handler to wear camouflage over their arms and hands while handling a dog.

An additional object is to provide a dog handler system that allows the dog handler to selectively camouflage their arm when not signaling their dog.

A further object is to provide a dog handler system that fits over various types of clothing such as but not limited to long-sleeved shirts and jackets.

Another object is to provide a dog handler system that can be easily attached and removed from an individual.

A further object is to provide a dog handler system that increases the surface area that may be viewed by the dog.

Another object is to provide a dog handler system that provides an easily viewable color.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
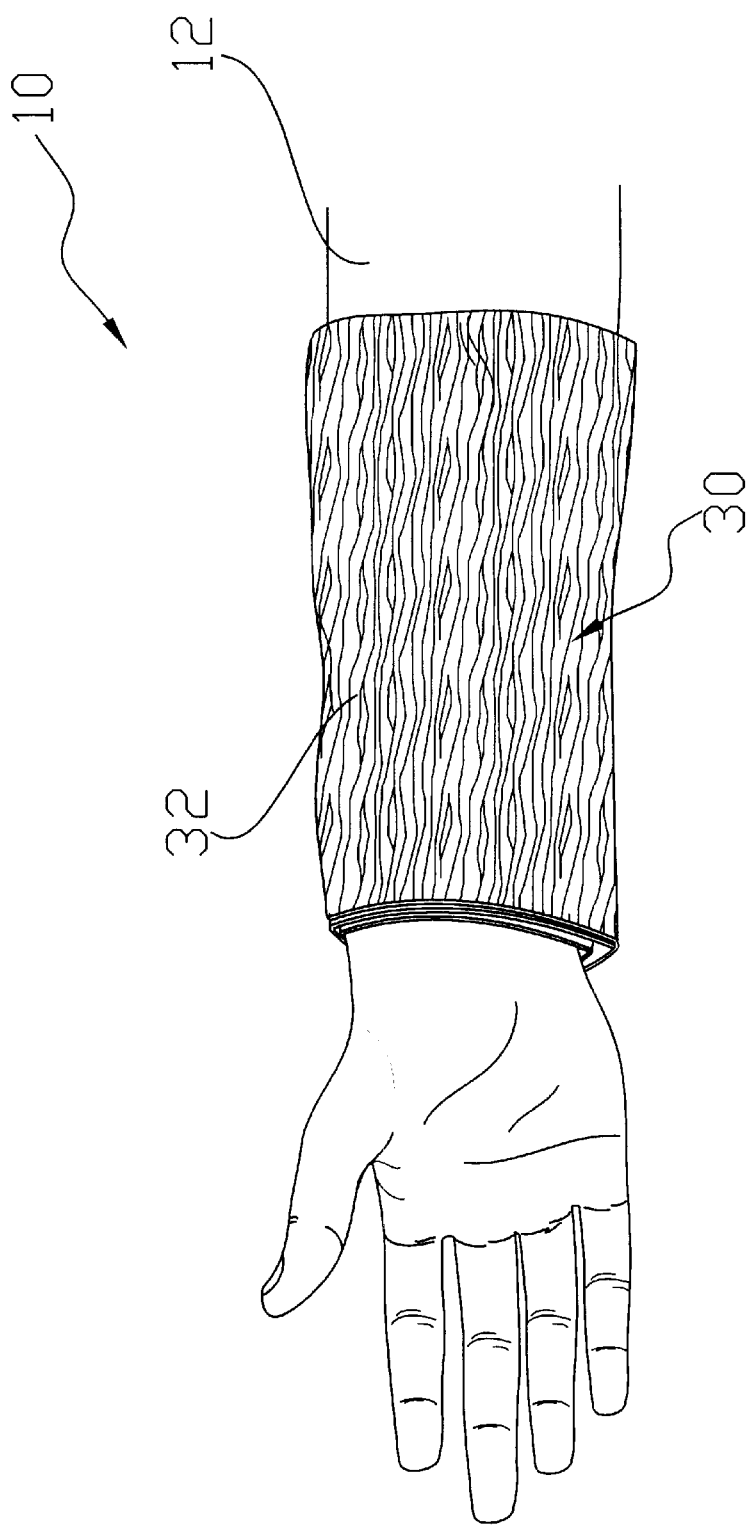
FIG. 1 is a front upper perspective view of the present invention attached about the wrist of an individual with the camouflaged flap engaged.

Turning now descriptively to the drawings, in which similar reference characters denote similar elements throughout the several views, FIGS. 1 through 5 illustrate a dog handler system 10, which comprises a sleeve member 20 having a first sleeve surface 22 and a second sleeve surface 24, a flap member 30 having a first flap surface 32 and a second flap surface 34 attached to a lower portion of the sleeve member 20, and a plurality of hook and loop fasteners attached to the sleeve member 20 and the flap member 30 for allowing selective securing of the flap member 30 about the second sleeve surface 24. The first sleeve surface 22 and the first flap surface 32 are comprised of a camouflage color and design. The second sleeve surface 24 and the second flap surface 34 are comprised of a non-camouflage color and design that is easily viewed by a dog.

Figure 2:
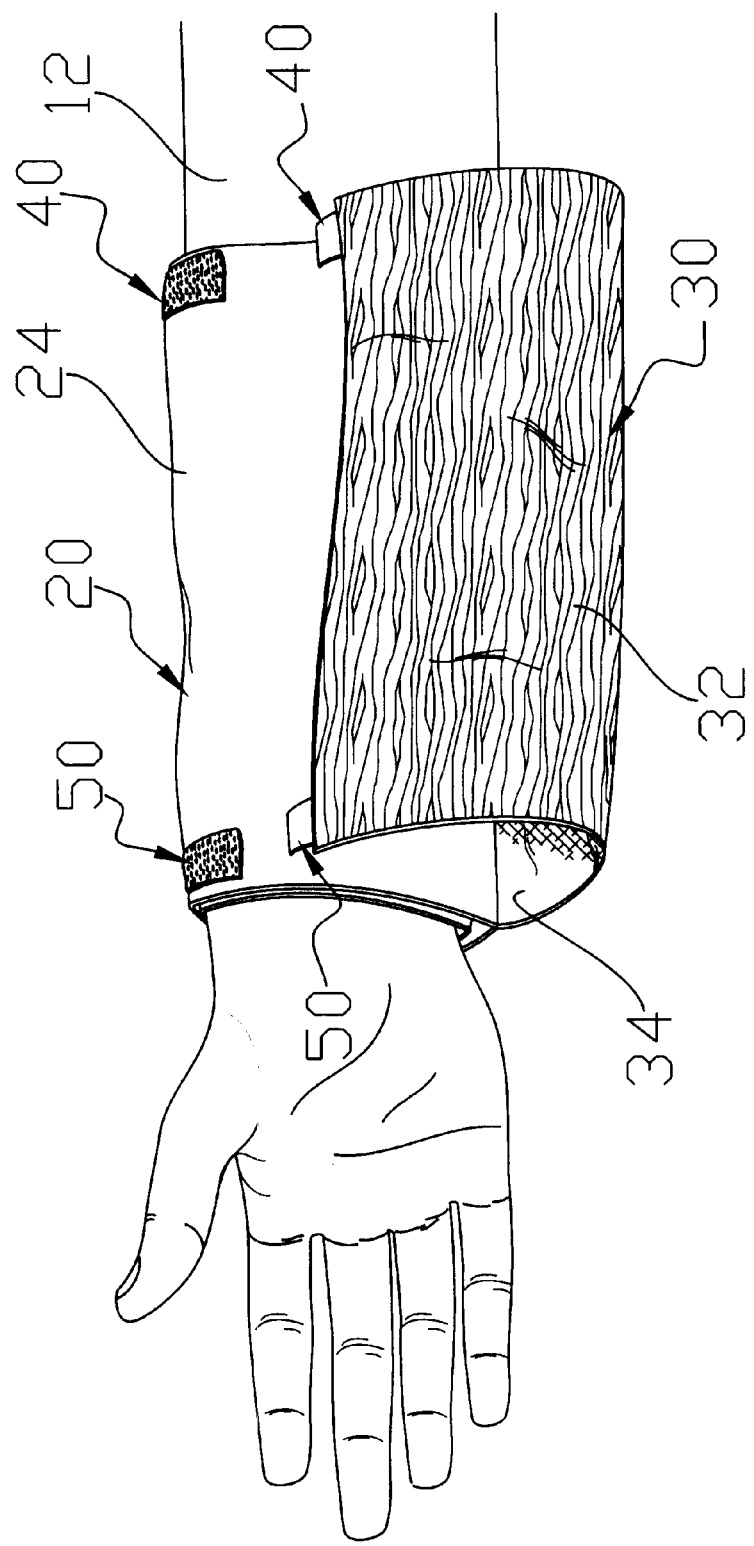
FIG. 2 is a front upper perspective view of the present invention attached about the wrist of an individual with the camouflaged flap partially removed from the sleeve member.
Figure 3:
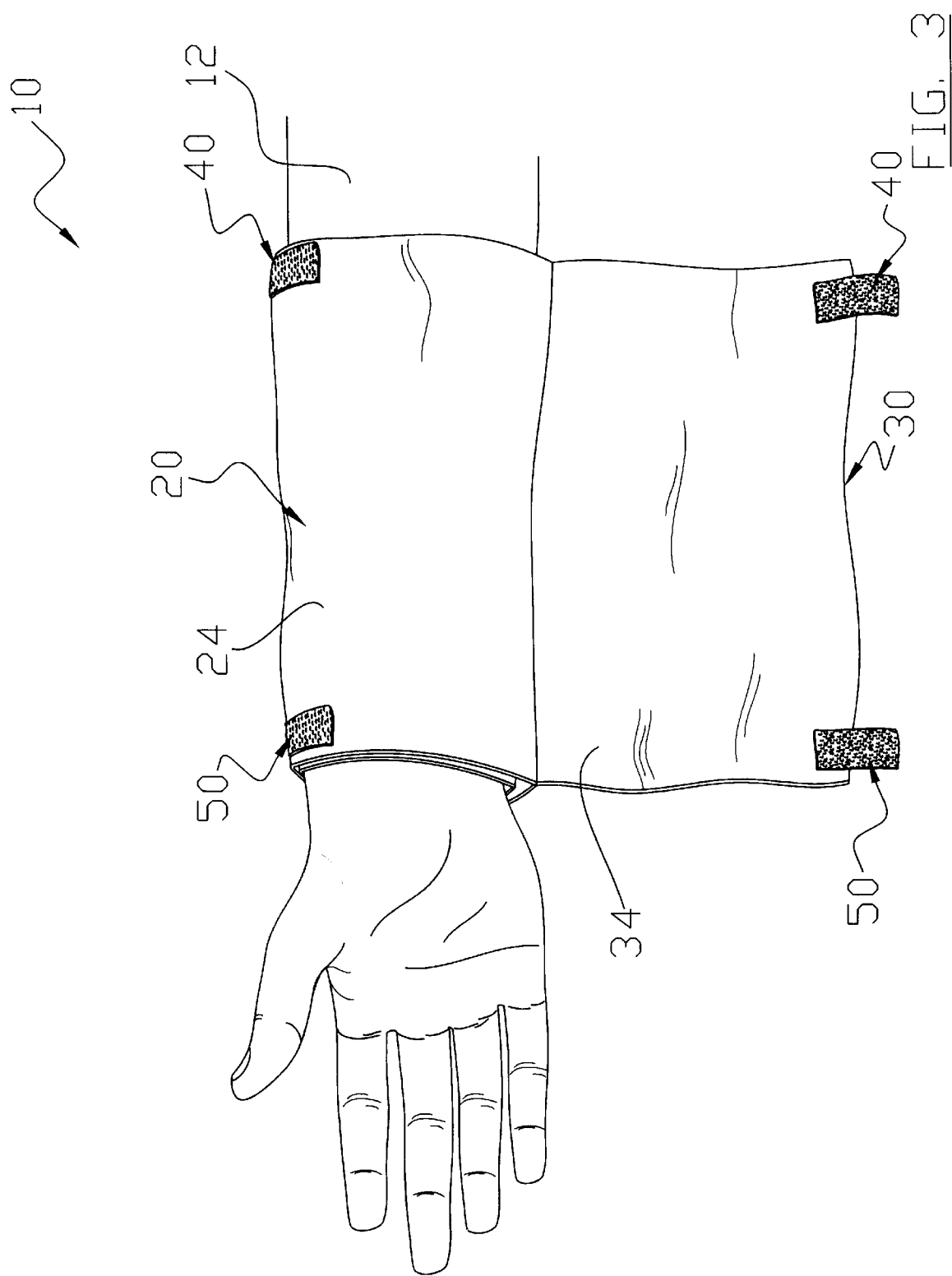
FIG. 3 is a front upper perspective view of the present invention attached about the wrist of an individual with the camouflaged flap removed from the sleeve member illustrating the non-camouflaged surfaces of the sleeve member and the flap member.

As shown in FIGS. 2 and 3 of the drawings, the sleeve member 20 is comprised of a tubular structure that is positionable over a hand and about the wrist 12 of an individual. The sleeve member 20 is preferably formed for being positioned over clothing such as a jacket or coat that an individual may be wearing. The sleeve member 20 is preferably comprised of a cloth material that may either be non-elastic, semi-elastic or elastic. The sleeve member 20 is preferably comprised of a solid tubular structure, however the sleeve member 20 may be comprised of one or more segments that are attached to one another via conventional attachment means such as buttons or hook and loop fasteners. The sleeve member 20 preferably has a constant diameter, however various other shapes maybe utilized to construct the shape and structure of the sleeve member 20.

Figure 4:
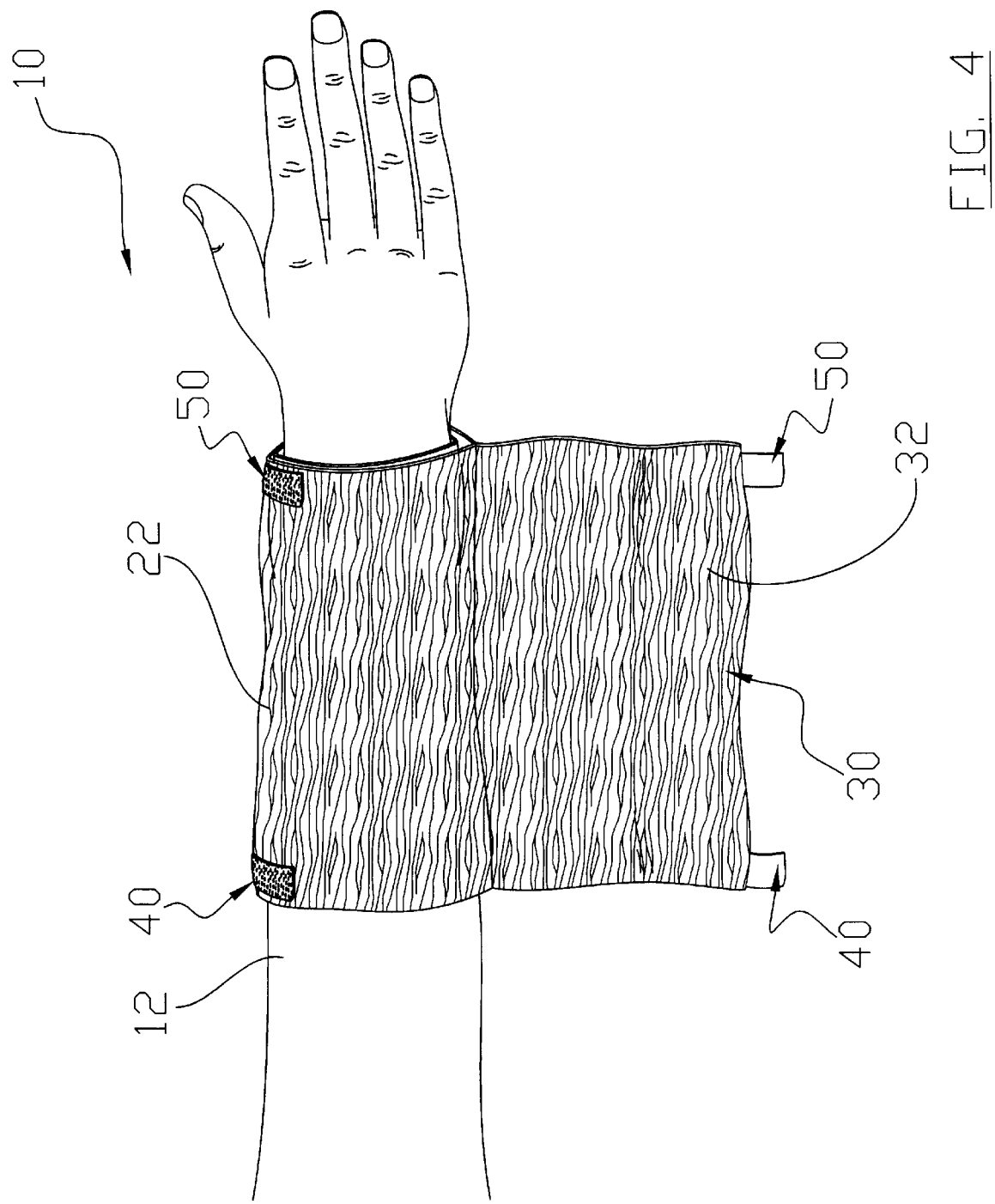
FIG. 4 is a rear upper perspective view of the flap member removed illustrating the camouflaged surfaces.
Figure 5:
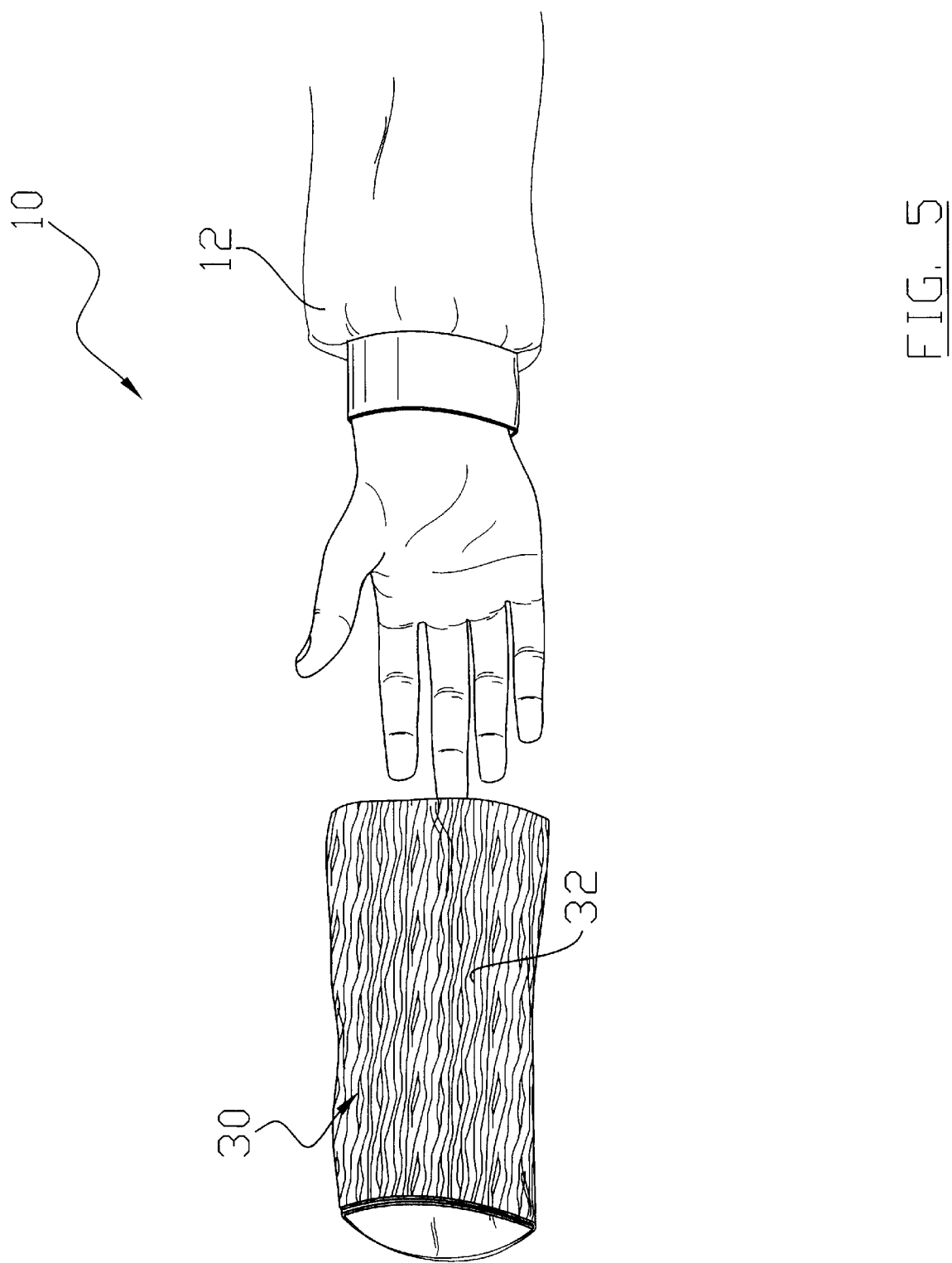
FIG. 5 is a front upper perspective view of the present invention being removed from the wrist of an individual.

As shown in FIGS. 3 and 4 of the drawings, the sleeve member 20 has a first sleeve surface 22 and a second sleeve surface 24 in opposition to one another. The first sleeve surface 22 comprises approximately 50% of the outer surface area of the sleeve member 20, however various other percentages may be utilized to accomplish the same task. The first sleeve surface 22 is preferably comprised of a camouflage color and design that is typically worn by hunters and the like which assists in hiding the appearance of the individual.

The second sleeve surface 24 is preferably comprised of a solid non-camouflage color and design as best shown in FIG. 3 of the drawings. The second sleeve surface 24 preferably has a solid white or black color which is easily viewed from a significant distance by a dog, however various other colors may be utilized. Additional designs using one or more colors may also be utilized within the second sleeve surface 24.

As shown in FIGS. 2, 3 and 4 of the drawings, the flap member 30 is attached to the lower portion of the sleeve member 20. The flap member 30 is preferably attached at the intersection of the first sleeve surface 22 and the second sleeve surface 24 as shown in FIGS. 3 and 4 of the drawings. The flap member 30 may be attached within the first sleeve surface 22 a finite distance away from the second sleeve surface 24.

The flap member 30 has a size and area sufficient to completely cover the second sleeve surface 24 as shown in FIGS. 1 through 3 of the drawings. The flap member 30 also has a width equal to or greater than the length of the sleeve member 20 as shown in FIGS. 3 and 4 of the drawings.

As shown in FIGS. 3 and 4 of the drawings, the flap member 30 has a first flap surface 32 and a second flap surface 34 in opposition to one another. The first flap surface 32 is preferably comprised of a camouflage color and design that is typically worn by hunters and the like which assists in hiding the appearance of the individual. The first flap surface 32 preferably is coordinated with the first sleeve surface 22 to provide a consistent appearance when the flap member 30 is secured about the second sleeve surface 24.

The second flap surface 34 is preferably comprised of a solid non-camouflage color and design as best shown in FIG. 3 of the drawings. The second flap surface 34 preferably has a color and design similar to the second sleeve surface 24 to provide a broad visual aid for the dog. The second flap surface 34 preferably has a solid white or black color which is easily viewed from a significant distance by a dog, however various other colors may be utilized. Additional designs using one or more colors may also be utilized within the second flap surface 34.

As shown in FIGS. 2 through 4 of the drawings, hook and loop fasteners 40, 50 are secured to the sleeve member 20 and the distal portion of the flap member 30 for allowing selective securing of the flap member 30 about the second sleeve surface 24. The hook and loop fasteners 40, 50 may have various sizes and lengths. The hook and loop fasteners 40, 50 secured to the flap member 30 preferably extend a finite distance away from the distal portion thereof as best illustrated in FIG. 4 of the drawings. Alternatively, various other types of fasteners may be utilized to secure the flap member 30 with respect to the sleeve member 20 such as but not limited to snap-buttons and elongate securing straps.

In use, the user secures the sleeve member 20 over their wrist 12 with the first flap surface 32 of the flap member 30 facing away from the inner portion of the wrist 12 as shown in FIG. 1 of the drawings. When the user desires to provide signals to their dog, the user simply removes the flap member 30 from about the sleeve member 20 by loosening the hook and loop fasteners 40 as shown in FIG. 2 of the drawings. The flap member 30 is allowed to fall downwardly when the fasteners 40, 50 are loosened thereby exposing the second sleeve surface 24 and the second flap surface 34 as shown in FIG. 3 of the drawings. The user is thereby able to signal to their dog the specific location of a fallen bird or other signals as desired. When finished providing signals to their dog, the user simply secures the flap member 30 about the second sleeve surface 24 thereby covering the second sleeve surface 24 from view.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dog handler system, comprising:
    a sleeve member having an elongate tubular structure having a first sleeve surface and a second sleeve surface;
    a flap member having a first end, a second end, a first flap surface and a second flap surface secured to said sleeve member, wherein said flap member is able to completely cover said second sleeve surface;
    wherein said first end of said flap member is attached to a lower portion of said sleeve member at an intersection of said first sleeve surface and said second sleeve surface;
    wherein when said flap member is removed from said sleeve member said second flap surface forms a continuous display with said second sleeve surface;
    wherein said first sleeve surface and said first flap surface are comprised of a camouflage color and design; and
    at least one fastener secured to said second end of said flap member and said sleeve member for allowing selective securing of said flap member about said sleeve member for completely covering said second sleeve surface.

2. The dog handler system of claim 1, wherein said first sleeve surface and said first flap surface are comprised of an identical colors and design.

3. The dog handler system of claim 2, wherein said second sleeve surface and said second flap surface are comprised of a solid color.

4. The dog handler system of claim 3, wherein said solid color is comprised of white.

5. The dog handler system of claim 3, wherein said solid color is comprised of black.

6. The dog handler system of claim 1, wherein said at least one fastener is comprised of a hook and loop fastener.

7. The dog handler system of claim 1, wherein said sleeve member is comprised of a cloth material.

8. A dog handler system, comprising:
    a sleeve member having an elongate tubular structure having a first sleeve surface and a second sleeve surface;
    a flap member having a first end, a second end, a first flap surface and a second flap surface secured to said sleeve member, wherein said flap member is able to completely cover said second sleeve surface;
    wherein said first end of said flap member is attached to a lower portion of said sleeve member at an intersection of said first sleeve surface and said second sleeve surface;
    wherein when said flap member is removed from said sleeve member said second flap surface forms a continuous display with said second sleeve surface;
    wherein said first sleeve surface and said first flap surface are comprised of a camouflage color and design;
    wherein said second sleeve surface comprises at least 50% of a total surface area of said sleeve member; and
    at least one fastener secured to said second end of said flap member and said sleeve member for allowing selective securing of said flap member about said sleeve member for completely covering said second sleeve surface.

9. The dog handler system of claim 8, wherein said first sleeve surface and said first flap surface are comprised of an identical color and design.

10. The dog handler system of claim 9, wherein said second sleeve surface and said second flap surface are comprised of a solid color.

11. The dog handler system of claim 10, wherein said solid color is comprised of white.

12. The dog handler system of claim 10, wherein said solid color is comprised of black.

13. The dog handler system of claim 8, wherein said at least one fastener is comprised of a hook and loop fastener.

14. The dog handler system of claim 8, wherein said sleeve member his comprised of a cloth material.

15. A method of operating a dog handler device attachable to an arm of a user, said dog handler device comprising a sleeve member having an elongate tubular structure having a first sleeve surface and a second sleeve surface, a flap member having a first end, a second end, a first flap surface and a second flap surface secured to said sleeve member, wherein said flap member is able to completely cover said second sleeve surface, wherein said first end of said flap member is attached to a lower portion of said sleeve member at an intersection of said first sleeve surface and said second sleeve surface, wherein when said flap member is removed from said sleeve member said second flap surface forms a continuous display with said second sleeve surface, wherein said first sleeve surface and said first flap surface are comprised of a camouflage color and design, and at least one fastener secured to said second end of said flap member and said sleeve member for allowing selective securing of said flap member about said sleeve member for completely covering said second sleeve surface, said method comprising the steps of:
    (a) removing said second end of said flap member from said sleeve member;
    (b) allowing said flap member to fall downwardly thereby allowing said second flap surface and said second sleeve surface to form said continuous display that provides a signal to a dog;
    (c) reattaching said second end of said flap member to said sleeve member after successfully signaling said dog thereby camouflaging said user.

16. The method of operating a dog handler device of claim 15, wherein said first sleeve surface and said first flap surface are comprised of an identical color and design.

17. The method of operating a dog handler device of claim 16, wherein said second sleeve surface and said second flap surface are comprised of a solid color.

18. The method of operating a dog handler device of claim 17, wherein said solid color is comprised of white.

19. The method of operating a dog handler device of claim 17, wherein said solid color is comprised of black.

20. The method of operating a dog handler device of claim 15, wherein said at least one fastener is comprised of a hook and loop fastener.

21. The method of operating a dog handler device of claim 15, wherein said sleeve member is comprised of a cloth material.

* * * * *